United States Patent Office 3,574,784
Patented Apr. 13, 1971

3,574,784
CARBON-NITROGEN BACKBONE BLOCK COPOLYMERS AS ANTISOILANTS
Morton H. Litt, University Heights, Ohio, and Jack L. Herz, East Syracuse, N.Y., assignors to Allied Chemical Corporation, New York, N.Y.
No Drawing. Filed Mar. 28, 1968, Ser. No. 716,979
Int. Cl. C08g 41/04
U.S. Cl. 260—823        12 Claims

ABSTRACT OF THE DISCLOSURE

Block copolymers prepared from 2-substituted-$\Delta^2$-oxazolines and 2-substituted-5,6-dihydro-4H-1,3-oxazines are excellent antisoilants for a wide variety of substrate materials. These block copolymers are prepared by first homopolymerizing either oxazine or oxazoline monomer; then the other monomer is added to the first-formed base polymer. The second monomer will add on to the end of the first-formed based polymer and homopolymerize, thereby forming block copolymers consisting essentially of joined oxazine and oxazoline homopolymer chains. A surface coating of these block copolymers significantly inhibits soiling of the coated substrate. Also, when deposited on the surface of, or incorporated into a substrate, these block copolymers are effective antistats.

BACKGROUND OF THE INVENTION

This invention relates to a process for treating materials to improve their resistance to soiling. More particularly, this invention relates to coating materials with oxazine/oxazoline-derived block copolymers to inhibit soiling of the coated materials. It also relates to imparting antistat properties to materials by incorporating block copolymer therein and to novel compositions of matter, namely, to the aforementioned oxazine/oxazoline-derived block copolymers.

The tendency of essentially any material to become soiled is well known. Millions, and probably billions, of dollars are spent yearly on cleaning a limitless variety of materials ranging from clothing to the exterior masonry surfaces of buildings.

SUMMARY OF THE INVENTION

It is an object of this invention to provide new compositions of matter useful in treating materials so as to reduce their tendency to become soiled.

It is a further object of this invention to teach a process for treating materials with the aforementioned novel compositions of matter whereby antisoilant or antistat properties are imparted to the treated material.

Further objects and advantages will become apparent from the description of the invention which follows in greater detail.

It has now been found in accordance with this invention that coating the surface of a material, or a portion thereof, with an oxazine/oxazoline-derived block copolymer significantly reduces the tendency of the thus-treated material to become soiled, i.e., impart antisoilant properties to the substrate. It is well known that two factors are involved in the tendency of a material, hereinafter referred to as the "substrate," to become dirty or soiled. The first factor is an electrostatic attraction on the part of the substrate for soilant matter in particulate or droplet form. The less the tendency of the substrate to become electrostatically charged, the less the attraction it will have for the soilant matter.

Our copending application, Ser. No. 687,462, filed Dec. 4, 1967, now U.S. Pat. 3,470,267, discloses that oxazine-derived polymers are effective antistats when deposited on the surface of, or incorporated into, a substrate having a tendency to acquire a static charge. The oxazine/oxazoline-derived block copolymers of the instant invention are likewise effective antistats when deposited on the surface of, or incorporated into, such a substrate.

The oxazine/oxazoline-derived block copolymers of the instant invention are somewhat different in physical properties from oxazine-derived homopolymers. The block copolymers have, in general, a nontacky, rubbery texture and, therefore, are handled and processed readily. Oxazine-derived homopolymers, on the other hand, tend to be gummy and are difficult to manipulate with conventional process equipment.

Oxazine/oxazoline- and oxazine-derived polymers will hereinafter be referred to as "oxazine/oxazoline" and "oxazine polymers," respectively, although it will be understood that on polymerization the oxazine or oxazoline monomer ring structure is opened.

The antistatic properties of a given substance may properly be defined as resistance to acquiring an electrostatic charge and capacity to dissipate an acquired electrostatic charge quickly. The resistance to acquiring a charge and the rapidity with which a given acquired charge is dissipated are readily dual aspects of the same fundamental property. The more rapidly and effectively a substance dissipates induced charge, the more resistant it is to acquiring a given induced charge potential. When two different materials are given the same degree of charge (electrostatic potential), the one possessing the better antistatic properties will be the one to dissipate its charge most rapidly; and conversely, the better the antistatic properties of a material, the more difficult it will be to impart to it a given electrostatic potential. The term "imparting antistatic properties," as used herein, signifies that a given substrate material, after treatment with an oxazine/oxazoline block copolymer in accordance with the teaching of the instant invention, will be less prone to acquire a given charge and will dissipate a given acquired charge more rapidly than will the same material untreated. Substances that have this ability to enhance the antistatic properties of other materials, i.e., impart antistatic properties, are known as "antistats."

The other factor involved in soiling is the wetting of the substrate surface by the soilant. This wetting of the surface is important with both liquid and nonliquid soilants. With liquid soilants, if the substrate surface is not wetted, the liquid soilant will merely run off or it can be wiped away. Absolutely dry solid soilants, likewise, do not readily adhere to a substrate and they may ordinarily be brushed away or they will fall away of their own accord when any electrostatic forces holding the dry solid to the substrate are neutralized. However, most solid soilants have their surface at least partially covered with liquid of one sort or another, e.g., water or organic liquid such as oil. This oily coating wets the surface of the substrate and effectively glues the soilant to the substrate independent of any electrostatic attractive forces. If the substrate surface is resistant to wetting, then this means of adhesion will not be available to the soilant particles. It is thus apparent that the resistance of the substrate surface to wetting is important in preventing soiling by either liquid or solid soilants.

In determining the wetting or nonwetting of solids by liquids, the criterion employed is the contact angle between the solid and the liquid. A liquid is said to wet the solid if the contact angle lies between 0° and 90°, and not wet the solid if the contact angle lies between 90° and 180°. For example, a drop of water placed on a paraffin surface retains a globular shape, whereas the same drop of water placed on a clean glass surface spreads out into a thin layer. In the first instance, the contact angle is almost 180° and in the second instance almost 0°. Thus, the water will not wet paraffin while it will wet glass. For a given liquid wetting agent, the lower the surface energy of the solid, the greater the contact angle. The oxazine/oxazoline block copolymers of the instant invention have low surface energies ranging from about 25 dynes/cm. down to as low as about 10 dynes/cm. compared to, for example, 31 dynes/cm. for polyethylene and 45 dynes/cm. for nylon 6.

We have found that oxazine/oxazoline block copolymers, when deposited on the surface of a substrate, impart antistatic properties to the substrate, and also because of their low surface energy, they tend to prevent wetting of the substrate surface by soilants. Because they are solids, the block copolymers, of course, do not tend to retain imbedded soilant particles in contrast to many tacky antisoilants. We have found that the block copolymers of the instant invention, because of their ability to impart combined antistatic-low surface energy properties to a substrate, are appreciably more effective as antisoilants than either oxazine or oxazoline homopolymer or mixtures of homopolymers or oxazine/oxazoline random copolymers.

Because they possess the ability to function both as antistats when coated onto or incorporated into the substrate and as low surface energy coatings, the block copolymers of the instant invention have an independent utility in either of these capacities. That is, where the substrate material has little tendency to acquire a static charge, e.g., wood, a coating of the block copolymer of the instant invention can advantageously serve to inhibit soiling of the substrate through imparting resistance to wetting. Conversely, these block copolymers also inhibit static charge build-up when deposited onto the surface or incorporated into a substrate having a tendency to acquire a static charge. When incorporated into the substrate, the block copolymers have little antiwetting effect but still impart antistatic properties.

The oxazine/oxazoline block copolymers useful in the practice of the instant invention may be represented by the general formula:

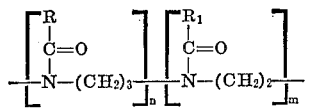

wherein R represents an aliphatic hydrocarbon radical having from 1 to 8 carbon atoms, which hydrocarbon radical may contain substituents that are inert under the polymerization conditions such as ether, ester, and halogen groups, and wherein $R_1$ represents an aliphatic hydrocarbon or halogenated hydrocarbon radical having from 4 to 20 carbon atoms.

The term "aliphatic" as used hereinabove contemplates normal and branched chain saturated, olefinic and acetylenic hydrocarbon radicals, which, as indicated above, may optionally contain certain substituent groups.

The ratio of $n:m$ can range from about 1:9 to about 30:1, preferably from 1:1 to 9:1, and $m+n$ can range from about 20 to about 300, preferably 80 to 200.

Illustrative examples of suitable R radicals include methyl, ethyl, propyl, isopropyl, butyl, hexyl, heptyl, isooctyl, the perfluorinated analogs of the preceding alkyl groups, jointed perfluoroalkyl-alkyl radicals such as 2-perfluorobutyl-ethyl, butenyl, acetoxyethyl, n-butoxyethyl, and mono- and triethoxyethyl. Illustrative examples of suitable $R_1$ radicals include butyl, hexyl, heptyl, isooctyl, dodecyl, myristyl, stearyl, and eicosyl; the perfluorinated or perchlorinated analogs of the preceding alkyl groups, jointed perfluoroalkyl-alkyl radicals such as 10-perfluoro ethyl, propyl, butyl, pentyl, hexyl, heptyl, octyl and decyl-decyl[$CF_3(CF_2)_n$—$(CH_2)_{10}$— wherein $n$ is 1 to 9], 5- perfluoro butyl and heptyl-pentyl and perfluoroheptylethyl, propyl, butyl and hexyl; heptenyl, dodecenyl, octadecenyl, heptadecadienyl, and heptadecatrienyl.

The preparation of perfluoroalkyl and jointed perfluoroalkyl-alkyl oxazolines and oxazines is described in U.S. Pat. No. 3,293,245.

Prefered copolymers are those wherein R is an alkyl group having from 1 to 6 carbon atoms and $R_1$ is an alkyl or jointed fluoroalkyl group having 8 to 18 carbon atoms. Particularly preferred polymers are those wherein R is methyl, ethyl or n-propyl and wherein $R_1$ is $C_5$ to $C_{17}$ n-alkyl or jointed fluoro n-alkyl.

The preparation of the oxazine/oxazoline block copolymers of the instant invention is effected by a modification of the process taught in our copending application Ser. No. 382,343, filed July 13, 1964. It is disclosed therein that 2-substituted-$\Delta^2$-oxazolines, 2-substituted-5,6-dihydro-4H-1,3-oxazines or mixtures thereof may be polymerized using cationic catalysts to afford polymers of the structure

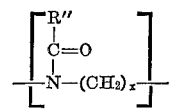

wherein R'' connotes the 2-substituent present on the oxazine or oxazoline monomer ring. When only oxazine monor is polymerized, $x=3$, and when only oxazoline monomer is used, $x=2$. Where a mixture of oxazoline and oxazine is copolymerized, $x=2$ or 3 substantially randomly along the polymer chain with the ratio of $n=2$ to $n=3$ units being essentially equal to the ratio of oxazoline to oxazine monomer in the mixture which is copolymerized.

The polymerization is customarily effectuated by stirring monomer and catalyst together in the substantial absence of oxygen with the concomitant application of heat so that the reaction takes place at about 50° to 250° C., preferably about 80° to 200° C.

Such random copolymers are to be distinguished from the block copolymers of the instant invention which comprise two joined polymer chains, each chain having exclusively an N-ethylene or N-trimethylene backbone.

It has been found, in accordance with the instant invention, that such oxazine/oxazoline block copolymers can be formed by adding either type of monomer to a fully preformed homopolymer prepared from the other type monomer. For example, an oxazine monomer can be homopolymerized until all the oxazine monomer has reacted, then oxazoline monomer, i.e., the other type monomer, can be added. The oxazoline monomer will add on, i.e., "grow on" the end of the already completely formed oxazine-base polymer chains and homopolymerize to form the desired block copolymer. In analgous fashion, oxazine monomer can be added onto the end of previously formed oxazoline-base polymer chains. Polymers such as the oxazine or oxazoline homopolymers which have an active chain end and can thus form a base or starting point for further polymer chain growth are called "living polymers."

The following equations are believed on the basis of available data to illustrate this block copolymer formation for the case wherein the oxazoline polymer chain is formed first and the oxazine polymer then grown on the preformed oxazoline polymer-base chain.

(1) 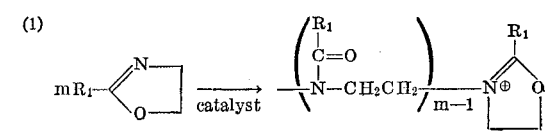

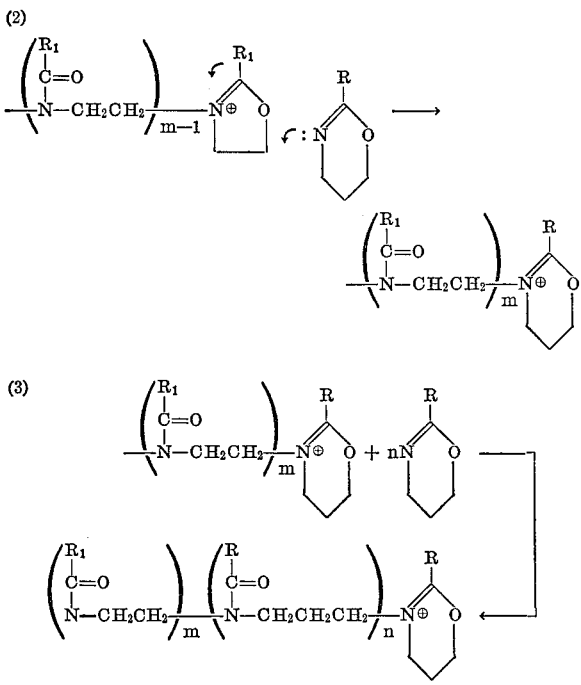

Such base polymers will "die," i.e., lose their ability to initiate further polymer chain growth, if the catalytically receptive end group containing the quaternary nitrogen is attacked by some active polar molecule such as water. In practice it is therefore desirable to store polymers that are to be used as a base and are to further react with additional monomer of the other type under substantially anhydrous conditions.

Obviously, the base polymer can be formed by polymerizing a mixture of oxazine monomers or a mixture of oxazoline monomers, i.e., oxazine or oxazoline monomers having various R or $R_1$ groups, and the other type monomer then added on this mixed R group polymer base. Conversely, after the base polymer has been formed, a mixture of monomers of the other type, i.e., other type monomer of mixed R or $R_1$ group, can be added to the base polymer. Ordinarily, however, no advantage accrues from forming the base from a mixture of the same type monomer or adding on a mixture of monomers of the same type to the preformed base polymer. Thus, in the block copolymer of the structure

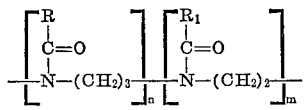

all R groups will preferably be the same and all $R_1$ groups will preferably be the same. As previously indicated, however, R and $R_1$ can be the same, but preferably they are not.

The term cation-active catalyst is a term well known in the polymerization art. It connotes that class of catalyst materials which are capable of initiating vinyl polymerization by reaction with the double bond of a vinyl monomer through an electron-pair displacement process to thereby create a carbonium ion reactive site at the end of the resulting polymerizable adduct. Typical catalyst of this type include the strong protonic acids such as sulfuric, hydrobromic and hydriodic, trichlor- and trifluoroacetic, perchloric, fluoboric, fluoantimonic, and organic sulfonic acids such as p-toluene sulfonic, benzene sulfonic, ethane sulfonic, and α- and β-naphthalene sulfonic; Lewis acids (also commonly called Friedel-Crafts reagents because of the widespread use of these compounds in the classical Friedel-Crafts reaction) such as metal halides like aluminum chloride and bromide, boron trifluoride and addition products thereof, boron trichloride, tin and titanium tetrachloride, the pentafluorides and pentachlorides of arsenic and antimony and elementory iodine; and esters and salts of strong acids such as dimethyl and diethyl sulfate, alkyl sulfonates, alkyl bromides and iodides, mixed sulfonic acid-carboxylic acid anhydrides of the general formula $RSO_2OCOR'$ wherein R and R' are the same or different alkyl, cycloalkyl or aryl groups, triphenylmethyl fluoborate, aryldiazonium fluoborates, and salts of strong acids with oxazolines, and the like. Preferred catalysts are dimethyl sulfate, 2-alkyl or aryl oxazolonium perchlorates, and methyl-p-toluenesulfonate. The amount of catalyst used is not critical and virtually any amount will initiate polymerization. Ordinarily from 100 to 10,000 mols of monomer per mol of catalyst is used.

With block copolymers of the type herein disclosed, the ratio of the two type monomers, i.e., oxazine and oxazoline, incorporated into the block copolymer will be substantially equal to the ratio of the mols of the first type monomer used to prepare the base "living" polymer chain relative to the number of mols of second monomer grafted onto the base chain in the second polymerization. Virtually any ratio of monomers can be incorporated into a block copolymer of the type disclosed herein. We have found that block copolymers containing from about 3 to about 90 mol percent oxazoline to correspondingly 97 to 10 mol percent oxazine have substantially the same surface energy and hence are substantially equally resistant to wetting. However, the antistat effectiveness of the block copolymers containing greater than 50 mol percent oxazine is substantially greater than that of the block copolymers containing less than 50 mol percent oxazine. Preferred block copolymers therefore contain from 50 to 90 mol percent oxazine and correspondingly from 50 to 10 mol percent oxazoline.

As heretofore indicated, the preferred R substituent on the oxazine-derived portion is an alkyl group having from 1 to 6 carbon atoms. Particularly preferred polymers are those wherein R is methyl, ethyl or n-propyl. The preferred $R_1$ substituent on the oxazoline-derived portion of the block copolymer is an alkyl or jointed fluoroalkyl group containing 5 to 17 carbon atoms, particularly preferred $R_1$ groups are $C_5$ to $C_{12}$ n-alkyl and jointed fluoro n-alkyl.

Coating of substrates with oxazine/oxazoline block copolymers to inhibit soiling thereof, in accordance with the intsant invention, is most effective when the polymer is deposited over substantially the entire surface of the material as an at least monomolecular film. Under circumstances where the providing of a uniform copolymer film covering the entire surface is not possible, the effectiveness of the treatment at inhibiting soiling of the substrate will be somewaht reduced. However, we have found that deposition of virtually any finite amount of copolymer on the surface of the substrate being treated as either a continuous or discontinuous (e.g., speckled) phase effects a reduction in the tendency of the substrate material to become soiled, the amount of the reduction being generally proportional to the percentage of the surface of the substrate material covered with block copolymer.

The copolymer may be applied to the substrate surface in any suitable manner, e.g., melted and applied to the surface of the substrate in molten form as a thin film which solidifies on cooling. Alternatively, and preferably, the copolymer is dissolved in a volatile solvent and sprayed or painted onto the substrate surface thereby forming a film of copolymer on evaporation of the solvent. The solvent selected will depend on the molecular weight and R and $R_1$ groups, as defined above, of the copolymer, which determine its solubility, and on the chemical properties of the substrate being coated. The preferred solvent can readily be determined by the skilled artworker from among the many volatile solvents available. The only fundamental requirements are that the solvent dissolve the copolymer and either not dissolve the substrate or at least not dissolve it sufficiently rapidly to adversely affect the substrate surface finish before it evaporates. Suitable solvents include methanol, ethanol, isopropanol, butanol, acetone, methyl ethyl ketone, butyl acetate, dimethyl formamide, 1,4-dioxane, tetrahydrofuran, toluene, benzene, chloroform, and trichloroethylene. Application of the copolymer solution in the form of a spray is particularly advantageous when the substrate is fibrous as in the case of woven or knitted fabrics.

The block copolymers of the instant invention, as hereinabove indicated, when incorporated into a substrate, function as antistats. Where the substrate being treated will melt without decomposition, a molten mixture comprising the oxazine/oxazoline block copolymer and the molten substrate may be formed. On solidification by cooling, the alloy or physical blend, comprising the substrate with the oxazine/oxazoline block copolymer distributed therethrough, will be found to exhibit substantially greater antistatic properties than the unalloyed substrate. The antistatic block copolymer may also be incorporated into a substrate by precipitating the substrate from a solution containing the oxazine/oxazoline block copolymer or by spraying a solution of copolymer onto the substrate, evaporating the solvent, and extruding the coated substrate. Under these circumstances, where the oxazine polymer is substantially homogeneously distributed through the substrate rather than being deposited on the surface thereof, the reduction in the charge accumulation tendency of the substrate is dependent upon the substrate and upon the amount of oxazine polymer incorporated therein, the more block copolymer incorporated, the greater the antistat effect. The upper limit on the amount of copolymer which can advantageously be incorporated into the substrate in this fashion is generally limited only to the point at which it commences to adversely affect the physical properties of the substrate which, of course, varies with each substrate. Generally, the upper limit is about 10%.

Inasmuch as the materials which exhibit a tendency towards the accumulation of an electrostatic charge are poor conductors of electricity, such electrostatic charge accumulation, and likewise antistat activity, is generally considered by authorities in the field to be predominantly a surface phenomenon. However, at least under some circumstances this would seem not to be the case. For example, we have found that incorporation of oxazine/oxazoline block copolymer into nylon 6 lowered the surface resistivity of the nylon by a factor of 100 and reduced the volume resistivity of the nylon by a factor of almost 70. Likewise, the antistat properties of nylon 6 having block copolymer incorporated therein is not significantly affected by immersing the nylon in a solvent for the copolymer which is thereby leached from the surface of the nylon alloy. The block copolymers of the instant invention are also generally effective as antistats at a considerably lower concentration than conventional antistats whether incorporated into or coated on a substrate.

Substrate materials which may advantageously be treated with the block copolymers of the instant invention include natural and synthetic fibrous materials such as nylon 6 poly-ε-caprolactam, 6–10 a nylon obtained by the condensation of hexamethylene diamine with sebacic acid and 6—6 poly hexamethylene adipamide, rayon, acrylics, polyesters, wool, cotton, silk, and mixtures thereof, and nonwoven materials such as wood, nylon, leather, paper, molded or cast nylon, Lucite a trademark for acrylic resins which are polymeric esters of methacrylic acid

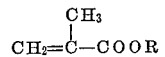

wherein R is methyl, ethyl, n-butyl, isobutyl, or combinations thereof, cellophane, glass, polyethylene, chlorinated polyethylene, polyethylene terephthalate, polyvinyl alcohol, polyvinyl chloride, polyvinylidene chloride, Bakelite a trademark for polyethylene, polypropylene, epoxy, phenolic, polystyrene, phenoxy, parylene, polysulfone, ethylene copolymers, ABS, acrylic or vinyl resins, and polystyrene.

The invention can be more fully understood by reference to the following examples. All parts are parts by weight unless otherwise expressly noted.

EXAMPLE 1

To a glass flask equipped with a stirrer, reflux condenser, and an addition funnel were added 12.5 grams (0.0556 mol) of 2-undecyloxazoline and 0.80 gram (0.0043 mol) of methyl-p-toluenesulfonate. The mixture was heated with stirring under nitrogen at 125° C. for 35 minutes to form the living base polymer. Then 37.0 gram (0.373 mol) of 2-methyloxazine was added, and heating with stirring under nitrogen continued an additional 2.5 hours. On cooling, the block copolymer was obtained as an amber solid.

EXAMPLE 2

The following polymers were prepared utilizing the procedure of Example 1.

| Base polymer | Mol percent base polymer * | Added polymer | Catalyst |
|---|---|---|---|
| 2-methyloxazine | 90 | 2-pentadecyloxazoline | Dimethyl sulfate. |
| 2-ethyloxazine | 75 | 2-undecyloxazoline | Methyl-p-toluenesulfonate. |
| Do | 50 | do | Do. |
| Do | 25 | do | Do. |
| Do | 10 | do | Do. |
| 2-pentyloxazine | 60 | 2-heptadecyloxazoline | 2-ethyloxazolonium perchlorate. |
| 2-heptyloxazine | 50 | 2-pentyloxazoline | Methyl-p-toluenesulfonate. |
| 2-methyloxazine | 44 | 2-heptadecyloxazoline | Do. |
| 2-undecyloxazoline | 75 | 2-methyloxazine | 2-p-chlorophenyloxazolonium perchlorate. |
| Do | 50 | do | Do. |
| Do | 25 | do | Do. |
| 2-perfluoropropyloxazine | 50 | 2-pentyloxazoline | H₂SO₄. |
| 2-(3-perfluoropropyl)propyloxazoline | 50 | 2-methyloxazine | n-Butyl iodide. |
| 2-perfluorohexyl oxazoline | 50 | do | Perchloric acid. |
| 2-(6-perfluorohexylhexyl)oxazoline | 40 | 2-n-propyl oxazine | Trichloroacetic acid. |
| 2-(6-perfluoropropylhexyl) oxazoline | 30 | 2-ethoxyethyl oxazine | BF₃ etherate. |
| Do | 50 | 2-ethyl oxazine | SbF₅. |
| 2-(10-perfluorohexyldecyl) oxazoline | 20 | 2-methyl oxazine | Ethane sulfonic acid. |

*Base polymer plus added polymer always equals 100%.

All of the above-indicated polymers substantially reduced the charge decay half-life of nylon 6-molded plaques when coated on the plaque surface. The surface energy of the above polymers ranged from a maximum of 25 dynes/cm. when the oxazoline side chains were hydrocarbons down as low as about 10 dynes/cm. for the polymers wherein the oxazoline side chain was perfluoroalkyl or jointed perfluoroalkyl-alkyl.

EXAMPLE 3

The effectiveness of several block copolymers of 2-methyl-4H-1,3-oxazine and 2-undecyloxazoline as antistats, when coated onto nylon 6 taffeta, is shown below. The copolymer was dissolved in chloroform or methanol to form 5% solutions. Swatches 1″ x 13″ of scrubbed nylon 6 taffeta were impregnated with these polymers by soaking in the polymer solution and evaporating off the solvent. The impregnated swatches were equilibrated for one day at 50% relative humidity prevailing during the subsequent charge decay half-life test, connected to a Type R-1019 Rothschild Static Voltmeter and given an applied static charge of 100 volts from a high voltage source within the meter. Two ends of the taffeta were affixed to negative ground electrodes 12" apart. The positive electrode was affixed to the middle of the sample swatch, 6" from each negative electrode. The charge decay half-life was then determined. The charge decay half-life ($t-\frac{1}{2}$) is the time required for the sample, which is connected to the ground, to loose static charge until it has a potential of only 50 volts. The less the $t-\frac{1}{2}$, the greater the antistatic properties of the material. Results are tabulated below.

Wt. percent 2-methyl oxazine
in copolymer:                                            $t-\frac{1}{2}$, sec.
75                                                        7
50                                                        9
25                                                       31
Control (no polymer added to nylon 6) _____ 1800

EXAMPLE 4

The same polymers utilized in Example 3 were added to molten nylon 6 and the molten mixture then molded into ⅞" x 7" x 0.01" plaques. The charge decay half-life was determined as in Example 3, except the negative ground electrodes holding the ends of the plaque were 6" apart so that the positive electrode was 3" from each negative ground.

| Wt. percent oxazine | Concentration of polymer in plaque, wt. percent | $t-\frac{1}{2}$, sec. |
|---|---|---|
| Control | 0 | >1,800 |
| 25 | 1.57 | 230 |
| 50 | 1.63 | 222 |
| 75 | 1.54 | 8 |
| 50 | 4.00 | 95 |
| 75 | 3.77 | 7 |

EXAMPLE 5

75/25 wt. percent 2-methyl-4H-1,3-oxazine/2-undecyl oxazoline-derived block copolymer was prepared according to the procedure of Example 1. This copolymer substantially reduced the wettability by distilled water and 20 weight motor oil of the following substrates: walnut wood, birdseye maple wood, tanned cordovan leather, percale cotton fabric, wool fabric, rayon fabric, silk fabric, and bond paper.

EXAMPLE 6

The polymer of Example 5 was dissolved in chloroform to make a 5% solution. This solution was sprayed onto various substrates and the chloroform evaporated at reduced pressure to leave a film of polymer covering the surface of the substrate. The antistatic properties of the following substrates were significantly enhanced by the coating of block copolymer: rayon fabric, polyethylene sheet, polyvinyl chloride sheet, hard rubber strip, Lucite sheet, and glass sheet.

EXAMPLE 7

The effectiveness of the 75/25 2-methyl oxazine/undecyl oxazoline copolymer of Example 5 as an antistat when incorporated into nylon 6 as in Example 4 was determined before and after 10 minutes of immersion of the molded plaque in chloroform. Results were as follows.

| Wt. percent polymer | $t-\frac{1}{2}$, sec. before immersion | $t-\frac{1}{2}$, sec. after immersion |
|---|---|---|
| 0 | >1,800 | >1,800 |
| 1.57 | 5±3 | 6±1 |
| 3.77 | 17±0 | 25±1 | as shown, chloroform extraction of the polymer at the plaque surface has little or no effect on $t-\frac{1}{2}$ which tends to show that the antistat activity of our polymers is a bulk phenomenon.

EXAMPLE 8

The effect of the block copolymer of Example 5 on the resistivity of nylon 6 when incorporated therein is shown below as calculated according to ASTM Test D257–66.

| Wt. percent copolymer in Nylon 6 | Volume resistivity (ohm cm.) | Surface resistivity (ohm) |
|---|---|---|
| 0 | $6.7\times10^{13}$ | $1.2\times10^{14}$ |
| 3.77 | $1.0\times10^{12}$ | $1.2\times10^{12}$ |

The effect of the block copolymer on the volume, as well as the surface, resistivity of the nylon 6 is quite significant and unusual and again indicates that antistat activity by our copolymers is a bulk phenomenon.

EXAMPLE 9

The block copolymer of Example 5 was incorporated into a nylon 6 fiber by extruding a mixture of nylon 6 and block copolymer through a 0.014" die. Antistat results are shown below.

Wt. percent copolymer in fiber:                    $t-\frac{1}{2}$, sec.
0                                             1800
1.57                                         23
3.97                                         18

The test was carried out by winding the fiber six complete turns around the negative and positive electrodes which were separated by a distance of 4". This type of electrode is referred to as the Rothschild high-resistance fiber electrode. These results indicate that the block copolymers of the instant invention are effective antistats in fiber at relatively low concentrations.

EXAMPLE 10

The following results indicate that the copolymer of Example 5 is effective even when very low concentrations are incorporated into a molded nylon plaque. Antistat tests were carried out as in Example 4.

Wt. percent polymer concentration:         $t-\frac{1}{2}$, sec.
3.77                                        7
1.57                                        5
0.97                                        33
0.49                                        83
0.24                                        177
0.12                                        235
0.00                                        >1800

Various modifications will be apparent to one skilled in the art and it is not intended that this invention be limited to the details in the specific examples presented by way of illustration. Accordingly, the scope of the invention is limited only by the appended claims.

We claim:
1. A process for preparing block copolymers comprising the steps of:
(a) contacting a single type monomer selected from the group consisting of:

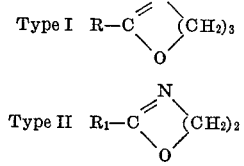

and

Type I    R—C (with N, O, (CH$_2$)$_3$ ring)

Type II    R$_1$—C (with N, O, (CH$_2$)$_2$ ring)

wherein R and R$_1$ are as defined in claim 1, with a cationic catalyst under polymerizing conditions for a time sufficient to effectuate polymerization of said monomer; and
(b) adding to the resulting polymer formed in step (a) from ⅛ to 9 mols of monomer of the other of said types per mol of monomer utilized in step (a) under polymerizing conditions for a time sufficient to effecuate block co-polymerization of said added other type monomer onto said polymer.

2. A process in accordance with claim 1 wherein Type I monomer is utilized in step (a) and wherein R is identical for all Type I molecules and wherein $R_1$ is identical for all Type II molecules.

3. A process in accordance with claim 1 wherein said cationic catalyst is selected from the group consisting of dimethyl sulfate, methyl-p-toluene sulfonate and 2-alkyl and 2-aryl oxazolonium perchlorates, and wherein said polymerizations are effectuated at a temperature ranging from about 80° C. to about 200° C.

4. A block copolymer prepared by a process comprising the steps of:
(a) contacting a single type monomer selected from the group consisting of

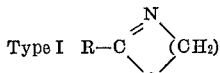

and

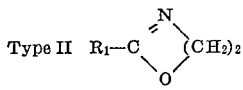

wherein R is a member selected from the group consisting of aliphatic and substituted-aliphatic hydrocarbon radicals having up to 8 carbon atoms and wherein $R_1$ is a member selected from the group consisting of aliphatic hydrocarbon and halogenated aliphatic hydrocarbon radicals having from 4 to 20 carbon atoms, with a cationic catalyst under polymerizing conditions for a time sufficient to effectuate polymerization of said monomer; and
(b) adding to the resulting polymer in step (a) from $\frac{1}{9}$ to 9 mols of monomer of the other of said types per mol of monomer utilized in step (a) under polymerizing conditions for a time sufficient to effectuate block co-polymerization of said added other type monomer onto said polymer.

5. A polymer in accordance with claim 4 wherein R is an alkyl group of up to 6 carbon atoms and wherein $R_1$ is an alkyl radical or jointed fluoroalkyl radical of 8 to 18 carbons.

6. A polymer in accordance with claim 4 wherein R is methyl, ethyl or n-propyl and wherein $R_1$ is a $C_5$ to $C_{17}$ n-alkyl or jointed fluoro-n-alkyl radical.

7. A process for imparting antisoilant properties to a substrate comprising coating at least a portion of the surface of said substrate with the polymer of claim 4.

8. A process in accordance with claim 7 wherein said coating is effectuated by depositing on the surface of said substrate a solution of said polymer in a volatile solvent and allowing said solvent to evaporate.

9. A process in accordance with claim 8 wherein said substrate is poly-ε-caprolactam.

10. A process for imparting antistatic properties to a substrate comprising incorporating substantially homogeneously within said substrate a minor amount of polymer of claim 4.

11. A process in accordance with claim 10 wherein said incorporation is effectuated by forming a substantially homogeneous molten mixture of said substrate and said polymer and thereafter solidifying said mixture by cooling.

12. A process in accordance with claim 11 wherein said substrate is poly-ε-caprolactam.

References Cited

UNITED STATES PATENTS

| | | | |
|---|---|---|---|
| 3,219,725 | 11/1965 | Kirkland et al. | 260—823 |
| 3,470,267 | 9/1969 | Litt et al. | 260—857 |

FOREIGN PATENTS

| | | | |
|---|---|---|---|
| 666,828 | 11/1965 | Belgium | 260—2EN |

MURRAY TILLMAN, Primary Examiner

M. J. TULLY, Assistant Examiner

U.S. Cl. X.R.

117—138.8, 145, 148, 155, 161; 260—857, 860, 874, 897, 899, 901